(12) United States Patent
Sung et al.

(10) Patent No.: US 11,691,587 B2
(45) Date of Patent: Jul. 4, 2023

(54) PASSENGER SEAT AIRBAG APPARATUS FOR VEHICLE

(71) Applicant: Autoliv Development AB, Vargarda (SE)

(72) Inventors: Seung-Wan Sung, Gyeonggi-do (KR); Hyun-Chul Yang, Gyeonggi-do (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 17/814,006

(22) Filed: Jul. 21, 2022

(65) Prior Publication Data

US 2023/0025221 A1 Jan. 26, 2023

(30) Foreign Application Priority Data

Jul. 21, 2021 (KR) .......................... 10-2021-0095885

(51) Int. Cl.
*B60R 21/201* (2011.01)
*B60R 21/2334* (2011.01)
*B60R 21/00* (2006.01)

(52) U.S. Cl.
CPC ........ *B60R 21/201* (2013.01); *B60R 21/2334* (2013.01); *B60R 2021/0004* (2013.01); *B60R 2021/0009* (2013.01); *B60R 2021/0048* (2013.01)

(58) Field of Classification Search
CPC .......................... B60R 21/201; B60R 21/2334
See application file for complete search history.

(56) References Cited

U.S. PATENT DOCUMENTS

| | | | |
|---|---|---|---|
| 5,765,867 A * | 6/1998 | French ................... | B60R 21/201 280/743.1 |
| 6,099,026 A | 8/2000 | Ando et al. | |
| 7,314,228 B2 | 1/2008 | Ishiguro et al. | |
| 7,695,013 B2 * | 4/2010 | Kakstis ................... | B60R 21/20 280/743.1 |
| 7,845,672 B2 | 12/2010 | Onohara | |

(Continued)

FOREIGN PATENT DOCUMENTS

| | | | | |
|---|---|---|---|---|
| CN | 204210418 U | * | 3/2015 | ........... B60R 21/201 |
| EP | 945312 A2 | * | 9/1999 | ............. B60R 21/16 |

(Continued)

*Primary Examiner* — Nicole T Verley
(74) *Attorney, Agent, or Firm* — Dickinson Wright PLLC

(57) ABSTRACT

A passenger seat airbag apparatus for a vehicle, including a housing installed in a structure inside the vehicle, an airbag cushion accommodated in a folded state inside the housing, and inflated and deployed between the structure inside the vehicle and an occupant to restrain and protect the occupant when the vehicle collides, and a flap having one end connected to a wrapper for wrapping the folded airbag cushion to guide a deployed direction of the airbag cushion while the airbag cushion is inflated and deployed. The flap is formed on both sides thereof with expansion parts for expanding a width of the flap wider than a width of an inner space of the housing. This invention further includes a structure inside the vehicle when the airbag cushion is inflated and deployed, which stably guides a deployed direction of the flap and the airbag cushion, enhancing deployment shape and performance.

8 Claims, 8 Drawing Sheets

(56) References Cited

U.S. PATENT DOCUMENTS

| | | | |
|---|---|---|---|
| 8,231,140 B2* | 7/2012 | Maripudi | B60R 21/2338 280/740 |
| 9,027,963 B2* | 5/2015 | Murakami | B60R 21/2338 280/743.2 |
| 9,623,832 B2* | 4/2017 | Miura | B60R 21/2334 |
| 9,682,678 B2* | 6/2017 | Rose | B60R 21/201 |
| 10,486,633 B2* | 11/2019 | Kino | B60R 21/268 |
| 11,465,580 B2* | 10/2022 | Silverwood | B60R 21/017 |
| 2009/0152842 A1* | 6/2009 | Benny | B60R 21/201 280/728.3 |
| 2010/0066059 A1* | 3/2010 | Klinkenberger | B60R 21/2334 280/728.1 |
| 2014/0070521 A1* | 3/2014 | Funakura | B60R 21/20 280/728.3 |
| 2016/0332591 A1* | 11/2016 | Schwark | B60R 21/2165 |
| 2019/0299914 A1* | 10/2019 | Yanagisawa | B60R 21/201 |
| 2020/0180542 A1* | 6/2020 | Hess | B60R 21/237 |

FOREIGN PATENT DOCUMENTS

| | | | | |
|---|---|---|---|---|
| JP | WO2015025630 A1 * | 2/2015 | | |
| JP | 2019166975 A * | 10/2019 | | |
| KR | 100699173 B1 | 3/2007 | | |
| KR | 100967685 B1 | 7/2010 | | |
| KR | 101781384 B1 | 9/2017 | | |
| KR | 101807660 B1 | 12/2017 | | |
| WO | WO-2006003748 A1 * | 1/2006 | | B60R 21/201 |
| WO | WO-2009066404 A1 * | 5/2009 | | B60R 21/201 |
| WO | WO-2014010661 A1 * | 1/2014 | | B60R 21/201 |
| WO | WO-2015025630 A1 * | 2/2015 | | B60R 21/201 |

\* cited by examiner

PASSENGER SEAT AIRBAG APPARATUS FOR VEHICLE

CROSS-REFERENCE TO RELATED APPLICATIONS

This application claims priority pursuant to 35 U.S.C. § 119(a) to South Korean Patent Application No. 10-2021-0095885, filed Jul. 21, 2021, the contents of which are incorporated herein by reference in its entirety.

FIELD

The disclosure relates to a passenger seat airbag apparatus for a vehicle, and more particularly, to a passenger seat airbag apparatus for a vehicle which is inflated and deployed between a structure of the vehicle and an occupant to protect an occupant when the vehicle collides.

BACKGROUND

An airbag is a representative safety device with a safety belt of a vehicle. The airbag includes a driver seat airbag, a passenger seat airbag, a side airbag, a curtain airbag, or the like.

The driver seat airbag protects a driver in the event of vehicle frontal collision. The driver seat airbag is mounted inside a steering wheel of a vehicle, and is instantaneously inflated when a predetermined impact is applied.

The passenger seat airbag is mounted inside an instrument panel of a vehicle, and is instantaneously inflated to protect an occupant on the passenger seat when the vehicle collides.

A collision test of a vehicle having such a safety device mounted therein is essential. Vehicle collision tests may include a vehicle frontal collision test, a side collision test, or the like, and there are various collision tests by country.

Among these, the vehicle frontal collision test is performed by placing dummies in a driver seat and a passenger seat, and by evaluating injuries to the head, chest, neck, etc. when a vehicle for testing is made to collide head-on with an obstacle at a required testing speed.

Recent safety standards announced by the respective governments in the world require to provide more fortified protection in the event of side or front collision. In addition, there is a continuous need for an airbag system which is economical in the aspect of manufacturing and installation, and can avoid interference while a vehicle manufacturer places various features inside a vehicle, and can be rapidly deployed. In particular, since occupants of a vehicle are positioned in certain positions among various positions in the vehicle when airbags are deployed, it is preferable to provide an airbag system which can protect from impacts across as wide a range as possible of the occupants' positions.

For example, North America FMVSS 208 regulations prescribe that unexpected injuries to small-body women or children should be prevented by an airbag designed for normal adults.

There is an increasing demand for fortified protection when 'small overlap' and 'oblique' collision occurs, as one of safety requirements that recently become prominent.

The small overlap collision is frontal collision that occurs on a relatively narrow portion on the left or right of the front of a vehicle.

The oblique collision is a frontal impact that occurs on the front of a vehicle while forming an angle, and is applied to a relatively narrow portion on the left or right of the front of the vehicle.

The above-described collision may cause a great deformation of a structure of the vehicle from the side where the impact occurs. In addition, the above-described collision may tend to cause deviation from a moving line since the center of a vehicle rotates. In this case, an occupant in the vehicle may move forward with a vector having components in a forward direction and a side direction.

Accordingly, an airbag is required to protect an occupant by restraining occupant's head and chest more rapidly and effectively in case of various scenarios.

For example, the present applicant has filed applications for patent by disclosing a passenger seat airbag apparatus configuration as in patent document 1 and patent document 2 presented below, and has received registration of patents.

Meanwhile, a related-art passenger seat airbag apparatus is provided with a flap to prevent a damage caused by interference with a structure inside a vehicle, for example, an instrument panel door, when an airbag cushion is initially deployed, in order to provide a low risk deployment (LRD) effect according to the above-described North America FMVSS 208 regulations.

However, the related-art passenger seat airbag apparatus has a problem that it is difficult to exactly guide a deployed direction of the airbag cushion due to a resistance while the flap is deployed.

In addition, the related-art passenger seat airbag apparatus is manufactured to have a width of the flap corresponding to a width of an inner space of a housing in which a folded airbag cushion is accommodated. To this end, there is a problem that it is difficult to completely prevent interference with a structure inside the vehicle like an instrument panel door.

Accordingly, the related-art passenger seat airbag apparatus has a problem that deployment performance of the airbag is degraded due to incomplete deployment of the airbag cushion, and occupants are not effectively protected.

CITED REFERENCES

Korean Patent Registration No. 10-1807660 (published on Dec. 12, 2017)
Korean Patent Registration No. 10-1781384 (published on Sep. 25, 2017)

SUMMARY

An object of the disclosure is to solve the above-described problems, and is to provide a passenger seat airbag apparatus for a vehicle which is inflated and deployed between a structure inside the vehicle and an occupant to restrain the occupant when the vehicle collides.

Another object of the disclosure is to provide a passenger seat airbag apparatus for a vehicle which applies a flap to prevent interference of an airbag cushion with a structure inside the vehicle when the airbag cushion is inflated and deployed.

Still another object of the disclosure is to provide a passenger seat airbag apparatus for a vehicle which can effectively guide a deployed direction of an airbag cushion by increasing a width of a flap.

In order to achieve the above-described objects, a passenger seat airbag apparatus for a vehicle according to the disclosure may include: a housing installed in a structure inside the vehicle; an airbag cushion accommodated in a folded state inside the housing, and inflated and deployed between the structure inside the vehicle and an occupant to restrain and protect the occupant when the vehicle collides;

and a flap having one end connected to a wrapper for wrapping the folded airbag cushion to guide a deployed direction of the airbag cushion while the airbag cushion is inflated and deployed, and the flap may be formed on both sides thereof with expansion parts for expanding a width of the flap wider than a width of an inner space of the housing.

As described above, the passenger seat airbag apparatus for the vehicle according to the disclosure provides the expansion parts on both sides of the flap, so that interference with a structure inside the vehicle may be effectively prevented when the airbag cushion is inflated and deployed.

Accordingly, the disclosure may prevent a damage or breakage caused by interference with the structure inside the vehicle when the airbag cushion is inflated and deployed.

In addition, according to the disclosure, the plurality of pairs of slits are formed between each of the expansion parts of the flap and a center part, and the expansion parts of the flap may be effectively deployed to both sides by dispersing a deployment pressure exerted to the flap when the airbag cushion is inflated and deployed.

Accordingly, according to the disclosure, a deployed direction of the flap and the airbag cushion may be stably guided, and a deployment shape and performance may be enhanced.

In addition, according to the disclosure, the expansion parts on both sides of the flap may be provided in two or more stages, and the width of the flap may further be expanded by increasing the number of slits formed on the flap, so that a deployment pressure may be effectively dispersed and the flap and the airbag cushion may be stably deployed.

DETAILED DESCRIPTION

Hereinafter, a passenger seat airbag apparatus for a vehicle according to a preferred embodiment of the disclosure will be described in detail with reference to the accompanying drawings.

Figure 1:
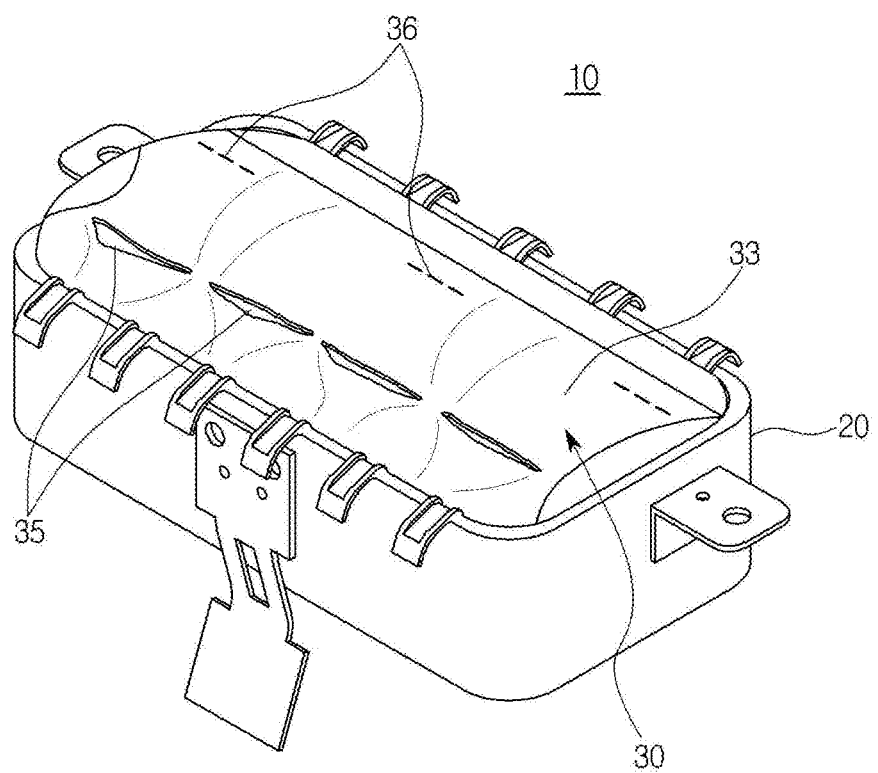
FIG. 1 is a perspective view of a passenger seat airbag apparatus for a vehicle according to a preferred embodiment of the disclosure.
Figure 2:
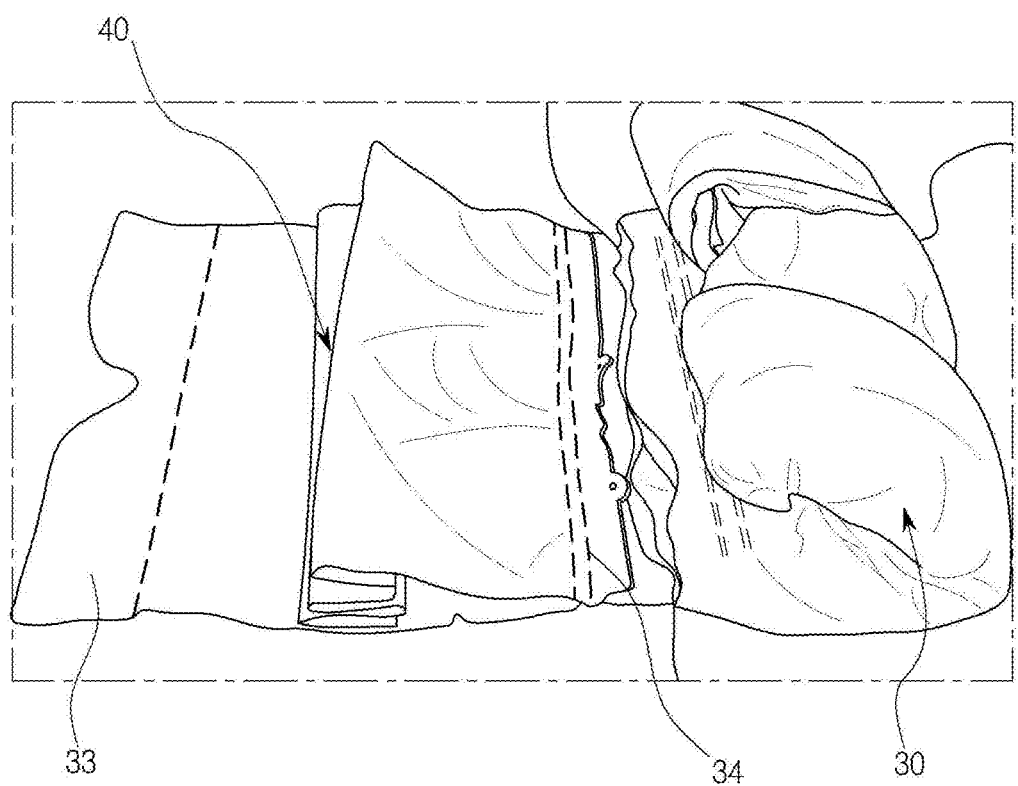
FIG. 2 is a view illustrating a folded state of a flap and an airbag cushion shown in FIG. 1.

FIG. 1 is a perspective view of a passenger seat airbag apparatus for a vehicle according to a preferred embodiment of the disclosure, and FIG. 2 is a view illustrating a folded state of a flap and an airbag cushion shown in FIG. 1.

Hereinafter, a direction of facing an engine room with reference to a seat in a vehicle is referred to as a 'forward direction,' and the opposite direction thereof is referred to as a 'backward direction.'

In addition, terms indicating directions such as 'left side,' 'right side,' 'upward direction,' and 'downward direction' are defined to indicate respective directions with reference to the forward direction and the backward direction described above.

As shown in FIG. 1, the passenger seat airbag apparatus 10 for the vehicle according to a preferred embodiment of the disclosure includes a housing 20 which is installed in a structure inside the vehicle, an airbag cushion 30 which is accommodated in a folded state inside the housing 20 and is inflated and deployed between the structure inside the vehicle and an occupant to restrain and protect the occupant when the vehicle collides, and a flap 40 which has one end connected to one side of the folded airbag cushion 30 to guide a deployed direction of the airbag cushion while the airbag cushion is inflated and deployed.

The housing 20 may be formed in a substantially hexahedral shape having one surface opened, and may be installed in a structure inside the vehicle, for example, inside an instrument panel.

Herein, the opened one surface of the housing 20 may be a rear surface facing an occupant. Therefore, the airbag cushion 30 accommodated inside the housing 20 may be inflated and deployed in the backward direction or in the backward direction and the upward direction so as to face an upper body of the occupant.

A cover (not shown) may be coupled to the opening of the housing 20, and a tear line may be formed on the cover to be torn when the airbag cushion 30 is inflated and deployed.

The cover may normally maintain a state of being connected with an outer surface of the structure inside the vehicle, for example, the instrument panel, and may have the tear line torn when the airbag cushion 30 is inflated and deployed and may function as a door to open the opening of the housing 20.

The airbag cushion 30 may be formed in a substantially bag-like shape by sewing an edge of a front panel facing in the forward direction of the vehicle and an edge of a rear panel disposed to face in the backward direction of the vehicle and coming into contact with the occupant when the airbag cushion is inflated and deployed.

An introduction part may be formed on the front panel of the airbag cushion 30 to introduce a gas from an inflater (not shown), and a vent hole may be formed on the rear panel to slowly discharge a gas inside the inflated and deployed airbag cushion 20.

The airbag cushion 30 may be accommodated inside the housing 20 in a folded state in various methods such as a folding method or a rolling method.

Herein, a wrapper 33 may further be installed on the airbag cushion 30 to wrap the folded airbag cushion 30 as shown in FIG. 2.

The wrapper 33 may be formed in a substantially rectangular shape, and one end of the wrapper 33, that is, a left end when viewed on FIG. 2, may be connected to one end of the folded airbag cushion 30 by a sewing line 34 which is formed in a sewing method.

A tear line 35 which is torn when the airbag cushion 30 is inflated and deployed may be formed on the wrapper 33.

The flap 40 functions to reduce an injury to neck, which may be induced by the airbag cushion 30 pressing the head of the occupant, by inflating and deploying the airbag cushion 30 to climb over the head of a child occupant in an abnormal seating state.

To achieve this, the flap 40 may reduce a friction between the airbag cushion 30 and the head of the occupant by wrapping the head of the occupant.

The flap 40 may be formed with the same material as the airbag cushion 30 or a similar fabric material in order to reduce a friction exerted between the airbag cushion 30 and the flap 40, and may be formed in a substantially rectangular shape to be extended longer than the wrapper 33.

The flap 40 may have one end connected to the wrapper 33 in a sewing method by the sewing line 34, and may be accommodated in a folded state inside the wrapper 33.

Figure 3:
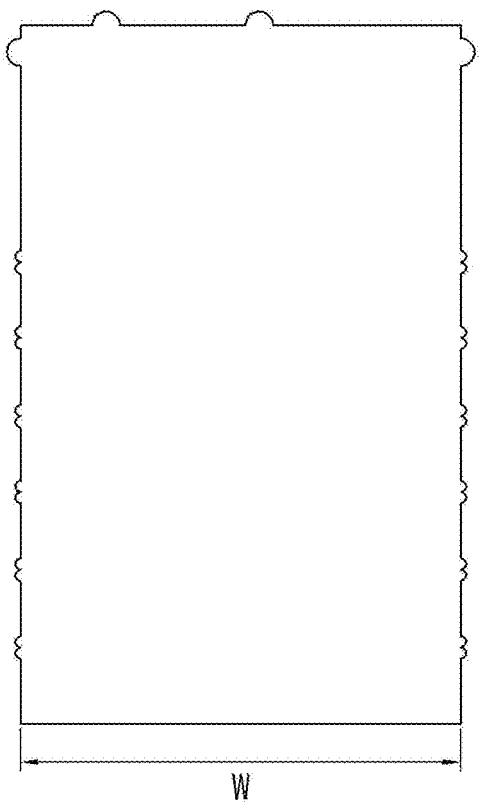
FIGS. 3 and 4 are development views of a flap according to related-art technology and a flap according to the present embodiment, respectively.
Figure 4:
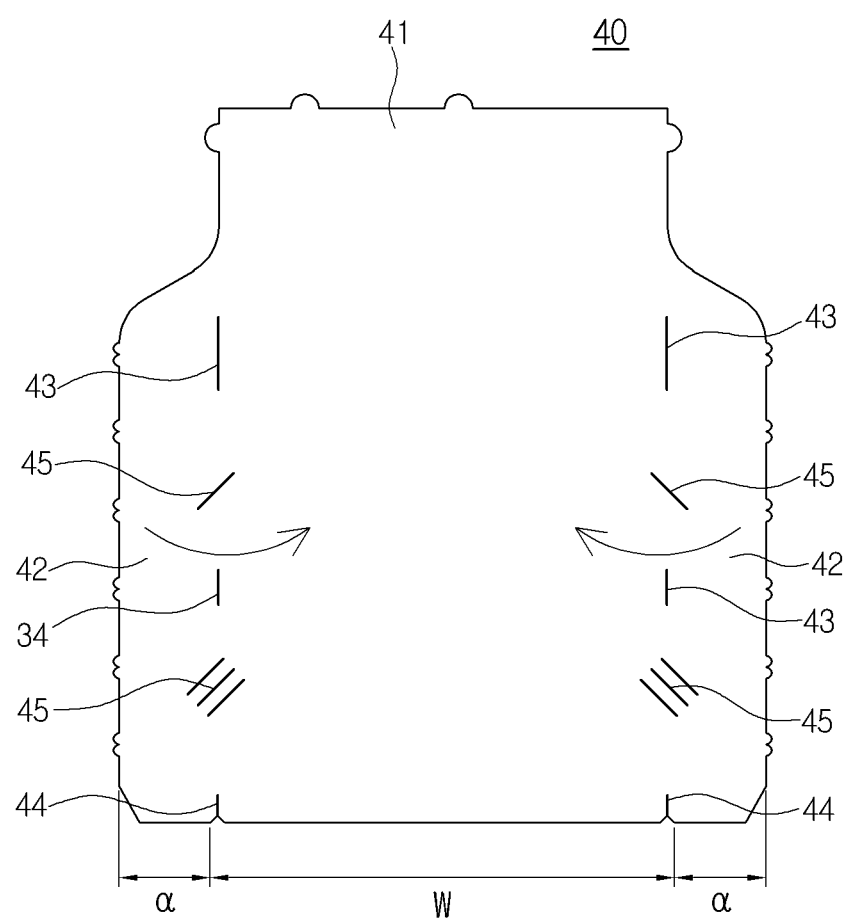

For example, FIGS. 3 and 4 are development views of a flap according to related-art technology and the flap according to the present embodiment, respectively.

The flap 40 applied to a passenger seat airbag apparatus according to related-art technology is formed in a substantially rectangular shape to have a width w corresponding to a width of the folded airbag cushion 30 as shown in FIG. 3.

Therefore, the related-art flap 40 may not completely prevent interference with a structure inside a vehicle, for example, an instrument panel door, while the airbag cushion 30 is deployed, and accordingly, there may be a problem that the airbag cushion 30 is damaged or broken.

In addition, the related-art flap 40 may be incompletely deployed due to a deployment pressure applied in a direction of interrupting the deployment when the airbag cushion 30 is deployed, and accordingly, there may be a problem that the flap 40 is not completely deployed to cover occupant's head.

Accordingly, the related-art flap 40 may have problems that it is difficult to effectively guide a deployed direction of the airbag cushion, and an injury to a child occupant in an abnormal seating state is not effectively prevented.

On the other hand, as shown in FIG. 4, the flap 40 applied to the passenger seat airbag apparatus 10 according to a preferred embodiment of the disclosure may be formed in a substantially rectangular shape, and one end of the flap 40, that is, an upper end 41 when viewed on FIG. 4, may be connected with the wrapper 33 in a sewing method by the sewing line 34.

In addition, the flap 40 may be disposed inside the wrapper 30 in a folded state by a folding or rolling method, and one end of the folded flap 40 may be fixed to the wrapper 33 along a provisional sewing line 36 shown in FIG. 1 in a provisional sewing method.

In particular, the flap 40 in the present embodiment may be formed with a width wider than the related-art flap 40.

For example, a center part and a lower end part except for an upper end part of the flap 40 may be formed to be expanded to both sides by +a compared to a width of the folded airbag cushion 30.

That is, the flap 40 according to the present embodiment may be formed with a width (w+2α) wider than the width (w) of the related-art flap 40.

Both side parts of the expanded flap 40, that is, a pair of expansion parts 42, may be folded to overlap the center part of the flap 40 along folding lines 43 corresponding to both ends of the related-art flap 40, respectively.

In the present embodiment, the flap 40 may be formed therein with a plurality of slits to effectively disperse a deployment pressure interrupting deployment of the flap 40 when the airbag cushion 30 is inflated and deployed.

For example, a pair of first slits 44 may be formed on lower ends of the flap 40 to deploy the lower end of the flap 40 toward both sides, and one or more pairs of second slits 45 may be formed on upper portions of the first slits 44 to deploy the expansion parts 42 on both sides of the flap 40 toward both sides.

Each of the first slits 44 may be formed convexly in the upward direction to have a cross section formed substantially in a '∧' shape or a '∩' shape.

Therefore, the first slit 44 may open and expand a part where the first slit 44 is formed on the lower end part of the flap 40 when the airbag cushion 30 is inflated and deployed.

Each of the first slits 44 may be formed with one or a plurality of slits.

Each of the second slits 45 may be formed in a linear shape inclined toward an upper portion of the center of the flap 40.

That is, the second slit 45 which is formed on the left with reference to an imaginary line of the center of the flap 40 may be formed to be inclined in a rightward and upward direction toward an upper portion of the imaginary line.

In addition, the second slit 45 which is formed on the right with reference to the imaginary line may be formed to be inclined in a leftward and upward direction toward the upper portion of the imaginary line.

Therefore, the second slits 45 may open and expand the expansion parts 42 on both sides of the flap 40 to the both sides when the airbag cushion 30 is inflated and deployed.

Herein, the second slit 45 may be changed to various numbers of second slits according to a vertical length of the flap 40.

That is, one pair of second slits 45 may be provided when the vertical length of the flap 40 is short, and two or three or more pairs of second slits may be formed when the vertical length of the flap 40 is long.

Herein, each of the second slits 45 may be formed with one or a plurality of slits.

FIG. 4 illustrates that each of one pair of second slits 45 formed on an upper side of the flap 40 includes one slit, and each of one pair of second slits 45 formed on a lower side of the flap 40 includes three slits, but the disclosure is not limited thereto. Each of the second slits 45 may be formed with one or a plurality of slits.

In addition, the second slit 45 may be formed not only in an inclined linear shape, but also may be changed to various shapes such as an arc shape or a semi-circular shape.

Of course, the second slit 45 may be formed not only in an inclined linear shape, but also in various shapes in order to increase an effect of dispersing a force exerted when the flap 40 is deployed.

Figure 5:
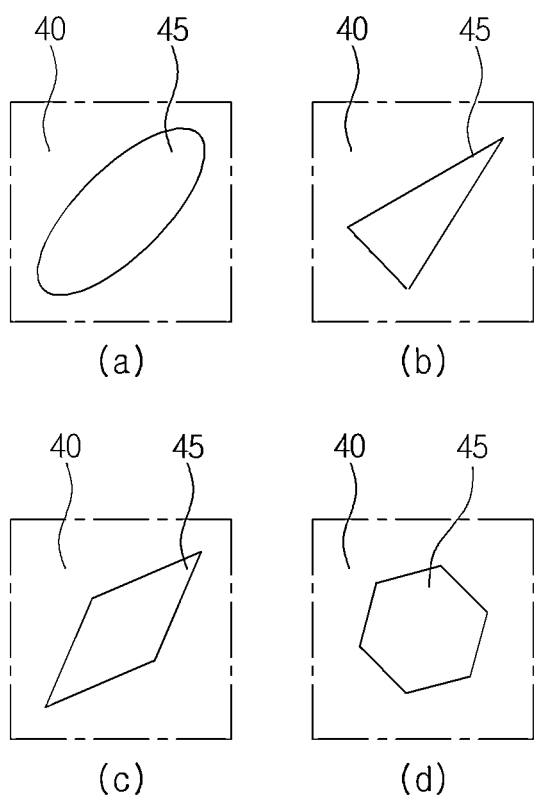
FIG. 5 is a view illustrating examples of a changed shape of a second slit.

FIG. 5 is a view illustrating examples of a changed shape of the second slit.

That is, as shown in (a) to (d) of FIG. 5, the second slit 45 may be formed in an oval shape or a circular shape, or may be changed to various shapes such as a triangular shape having a predetermined width in a horizontal direction, a diamond or rectangular shape, or a polygonal shape such as a hexagonal or octagonal shape, etc.

As described above, the second slit in the disclosure is formed to have a predetermined width like an oval or circular shape, a polygonal shape, so that a force exerted when the flap is inflated and deployed can be effectively dispersed and the expansion parts on both sides of the flap can be more easily expanded.

The first and second slits 44, 45 may be formed substantially on the folding line 43.

Of course, positions of the first and second slits 44, 45 may be variously changed.

However, the first and second slits 44, 45 should be formed at positions close to outer ends of the respective expansion parts 42 in order to achieve the effect of opening and expanding the expansion parts 45 on both sides of the flap 40 toward the both sides.

However, when the first and second slits 44, 45 are formed in extremely close proximity to the outer ends of the respective expansion parts 42, interference with the first and second slits 44, 45 may be caused in a process of cutting edges of the flap 40, and therefore, it may be difficult to neatly cut.

Accordingly, it is preferable that each of the first and second slits 44, 45 is formed at a position spaced from the outer end of each of the expansion parts 42 by a predetermined interval.

As described above, the disclosure provides the expansion parts on both sides of the flap, so that interference with a structure inside the vehicle may be effectively prevented when the airbag cushion is inflated and deployed.

Accordingly, the disclosure may prevent a damage or breakage caused by interference with the structure inside the vehicle when the airbag cushion is inflated and deployed.

In addition, the disclosure has the plurality of pairs of slits formed between each of the expansion parts of the flap and the center part, and may effectively deploy the expansion parts of the flap to the both sides by dispersing a deployment pressure exerted to the flap when the airbag cushion is inflated and deployed.

Accordingly, the disclosure may stably guide a deployed direction of the flap and the airbag cushion, and may enhance a deployment shape and performance.

Hereinafter, a coupling relationship and an operating method of the passenger seat airbag apparatus for the vehicle according to a preferred embodiment of the disclosure will be described in detail.

First, an operator places one ends of the wrapper 33 and the flap 40 to overlap one end of the airbag cushion 30, and connects along the sewing line 34 in a sewing method.

In addition, after folding the flap 40 in a folding or rolling method, the operator connects an end of the folded flap 40 to the wrapper 33 along the provisional sewing line 36 in a provision sewing method.

Next, the operator folds the airbag cushion 30 in a folding or rolling method, winds the wrapper 33 around the outer surface of the folded airbag cushion 30, and then, fixes an end of the wrapper 33 to the airbag cushion 30 in a sewing method.

The airbag cushion 30 wrapped by the wrapper 33 through the above-described process is accommodated in an inner space of the housing 20, and is mounted in a structure inside the vehicle, that is, in an instrument panel with the cover being coupled to the opening of the housing 20.

When a gas generated in the inflater in the event of vehicle collision is introduced into the airbag cushion 30, the airbag cushion 30 is inflated and deployed outside the housing 20 while tearing the cover and the wrapper 33.

In this case, the flap 40 is inflated and deployed along with the airbag cushion 30 while the provisional sewing line 36 provisionally sewed onto the wrapper 33 is separated from the wrapper 33.

Figure 6:
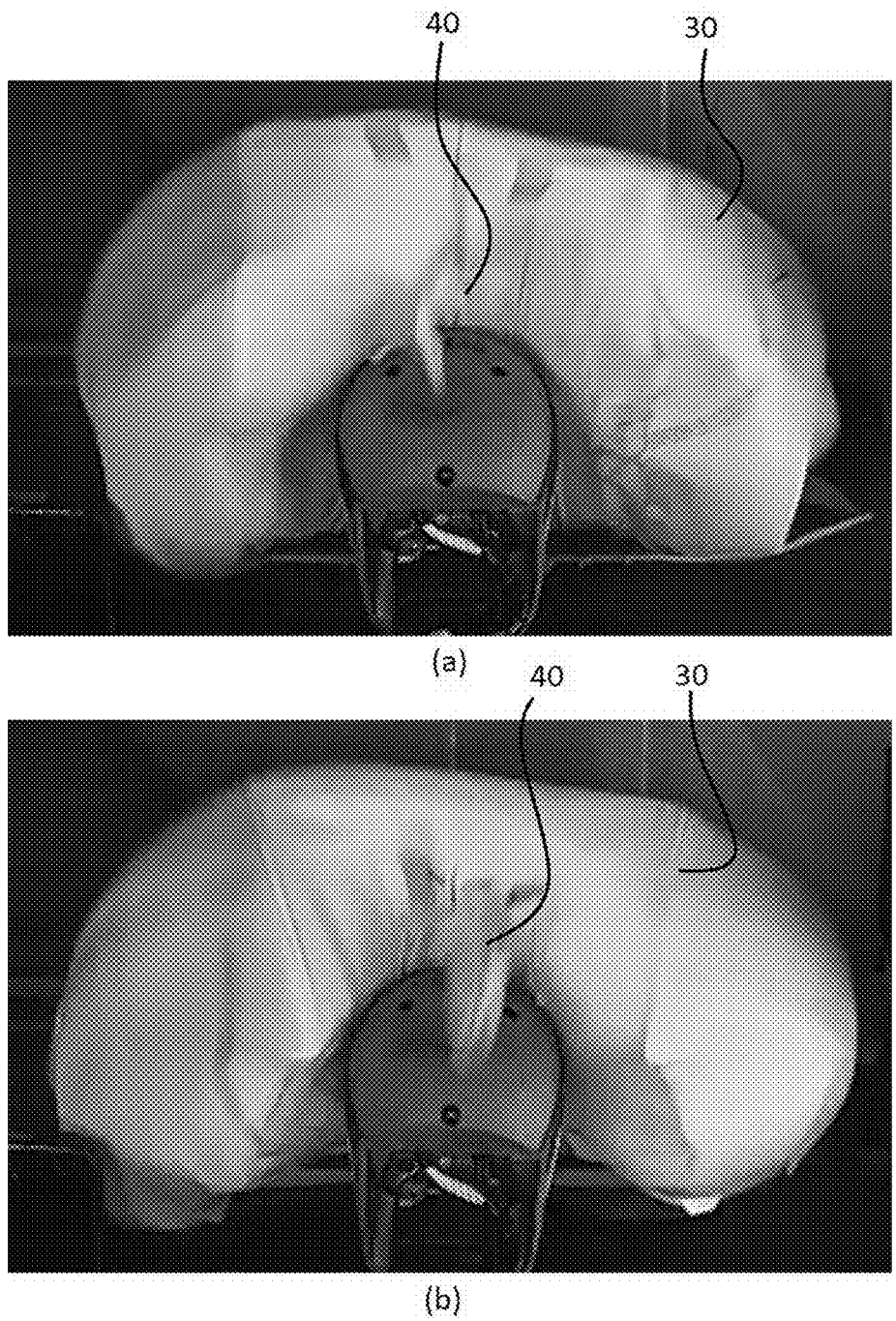
FIGS. 6 and 7 are operation state views showing inflation and deployment operations of the related-art flap and the flap according to the present embodiment, respectively.
Figure 7:
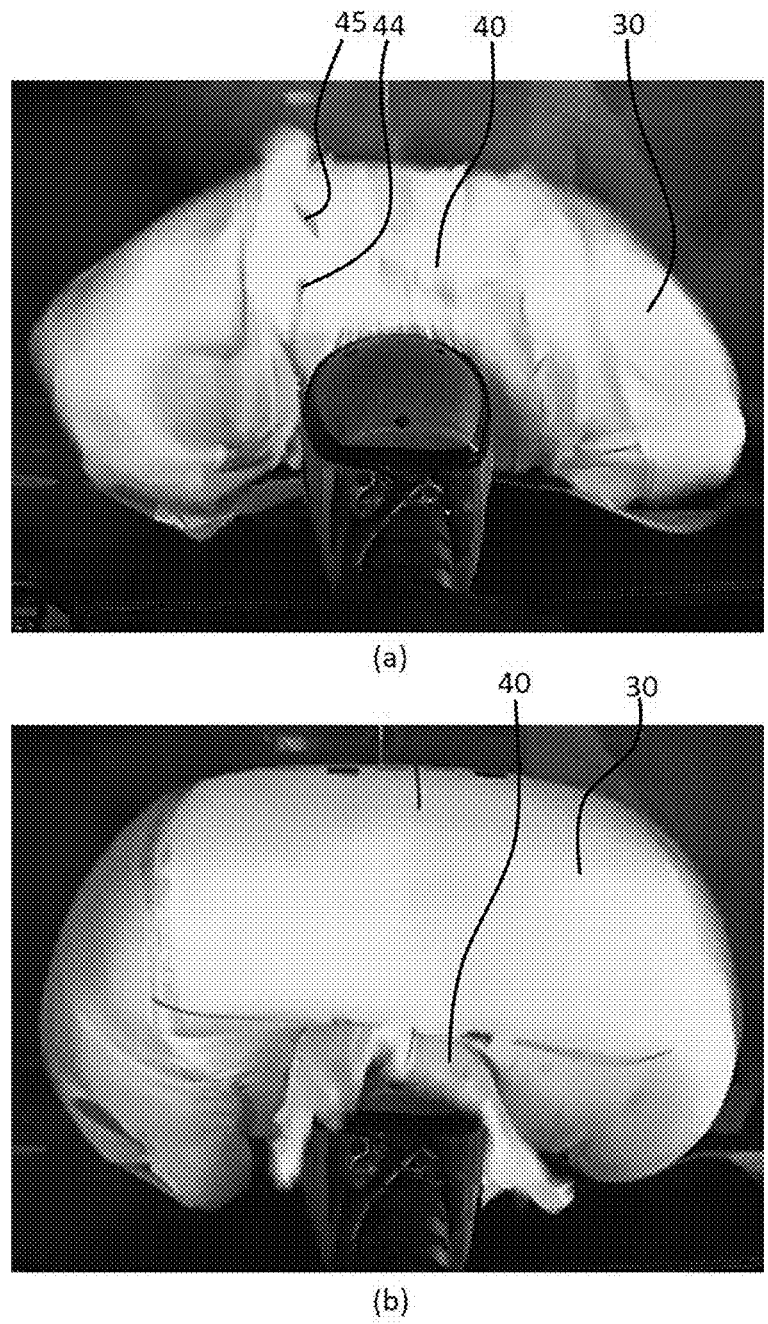

For example, FIGS. 6 and 7 are operation state views showing inflation and deployment operations of a related-art flap 40 and the flap 40 according to the present embodiment, respectively.

In FIG. 6, (a) and (b) illustrate an initial deployment state and a complete deployment state of the flap 40 and the airbag cushion 30 of related-art technology, respectively.

In addition, (a) and (b) of FIG. 7 illustrate an initial deployment state and a complete deployment state of the flap 40 and the airbag cushion 30 according to the present embodiment, respectively.

As shown in (a) and (b) of FIG. 6, it can be seen that the related-art flap 40 is tilted toward one side or goes into an unstable deployment state due to a development pressure exerted during a deployment process, and does not completely cover the head of a dummy.

On the other hand, the plurality of first and second slits 44, 45 formed on the flap 40 are expanded at the beginning of deployment, and a deployment pressure is dispersed, so that the expansion parts 42 on both sides of the flap 40 according to the present embodiment are opened and expanded to both sides as shown in (a) and (b) of FIG. 7.

Accordingly, the flap 40 according to the present embodiment completely covers the head of a dummy, and stably guides a deployed direction of the airbag cushion 30, so that deployment performance and effect may be enhanced.

Through the above-described process, the disclosure provides the expansion parts on both sides of the flap, so that interference with a structure inside the vehicle may be effectively prevented when the airbag cushion is inflated and deployed.

Accordingly, the disclosure may prevent a damage or breakage caused by interference with the structure inside the vehicle when the airbag cushion is inflated and deployed.

In addition, the disclosure has the plurality of pairs of slits formed between each of the expansion parts of the flap and the center part, and may effectively deploy the expansion parts of the flap to the both sides by dispersing a deployment pressure exerted to the flap when the airbag cushion is inflated and deployed.

Accordingly, the disclosure may stably guide a deployed direction of the flap and the airbag cushion, and may enhance a deployment shape and performance.

Although it is illustrated in the above-described embodiment that one pair of expansion parts 42 are provided on both sides of the flap 40 and the first and second slits 44, 45 are formed on both sides, the disclosure is not limited thereto.

Figure 8:
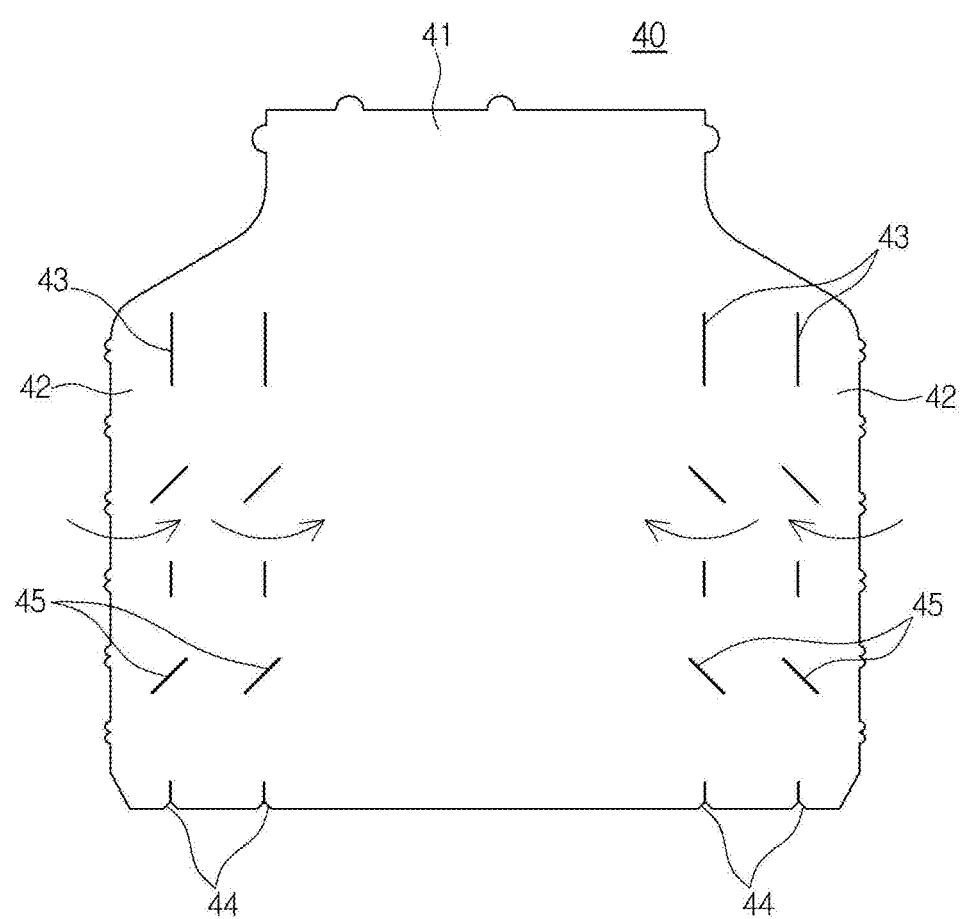
FIG. 8 is a development view of a flap applied to a passenger seat airbag apparatus for a vehicle according to another embodiment of the disclosure.

For example, FIG. 8 is a development view of a flap applied to the passenger seat airbag apparatus for the vehicle according to another embodiment of the disclosure.

The flap 40 applied to the passenger seat airbag apparatus 10 for the vehicle according to another embodiment of the disclosure may have expansion parts 42 formed on both sides of the flap 40 and extended in two or more stages to be folded to overlap each other with reference to a plurality of folding lines 43.

In addition, each of the first and second slits 44, 45 formed on the flap 40 may be provided with a plurality of pairs, and each of the first slit 44 and the second slit 45 may be formed with a plurality of slits.

As described above, the disclosure provides the expansion parts on both sides of the flap in two or more stages, and further expands the width of the flap by increasing the number of slits formed on the flap, so that a deployment pressure may be effectively dispersed and the flap and the airbag cushion may be stably deployed.

Although the invention made by the inventors of the present application has been specifically described according to the above embodiments, the present disclosure is not limited to the above embodiments, and may be modified variously within a scope of the technical essence of the disclosure.

The disclosure is applied to technology of a passenger seat airbag apparatus for a vehicle, which effectively prevents interference with a structure inside the vehicle when an airbag cushion is inflated and deployed, and stably guides a deployed direction of the flap and the airbag cushion, thereby enhancing a deployment shape and performance.

The invention claimed is:

1. A passenger seat airbag apparatus for a vehicle, the passenger seat airbag apparatus comprising:
   a housing installed in a structure inside the vehicle;
   an airbag cushion accommodated in a folded state inside the housing, and inflated and deployed between the structure inside the vehicle and an occupant to restrain and protect the occupant when the vehicle collides; and
   a flap having one end connected to a wrapper for wrapping the folded airbag cushion to guide a deployed direction of the airbag cushion while the airbag cushion is inflated and deployed, wherein
   the flap is formed on both sides thereof with expansion parts for expanding a width of the flap wider than a width of an inner space of the housing, and
   the flap is further formed with a plurality of slits for expanding the flap to both sides by dispersing a force applied when the airbag cushion and the flap are inflated and deployed.

2. The passenger seat airbag apparatus of claim 1, wherein the slit includes:
   a first slit formed at an opposite end formed on an opposite side of one end through which the flap is connected to the airbag cushion; and
   a second slit formed between the first slit and the one end of the flap.

3. The passenger seat airbag apparatus of claim 2, wherein the first slit is formed convexly toward the one end of the flap from the opposite end of the flap so as to expand the opposite end of the flap to both sides when the flap is inflated and deployed.

4. The passenger seat airbag apparatus of claim 2, wherein the second slit is formed in a shape inclined toward the one end of the flap from a center of the flap so as to expand the expansion parts to both sides when the flap is inflated and deployed.

5. The passenger seat airbag apparatus of claim 2, wherein the first slit and the second slit are formed around a pair of folding lines, respectively, which are folded such that the expansion parts on both sides of the flap overlap the flap.

6. The passenger seat airbag apparatus of claim 2, wherein each of the first and second slits is formed at a position spaced inward from an outer end of the expansion parts of both sides of the flap by a predetermined interval.

7. The passenger seat airbag apparatus of claim 6, wherein each of the first slit and the second slit includes at least one slit formed at each position.

8. The passenger seat airbag apparatus of claim 1, wherein the expansion parts on both sides of the flap are configured to have at least two stages so as to be folded to the flap about a plurality of folding lines, respectively.

* * * * *